(12) United States Patent
Bacon et al.

(10) Patent No.: US 12,418,196 B2
(45) Date of Patent: Sep. 16, 2025

(54) BACK-UP THRUST REVERSER ACTUATION SYSTEM CONTROL

(71) Applicant: Goodrich Actuation Systems Limited, Solihull (GB)

(72) Inventors: Peter William Bacon, Wolverhampton (GB); Maamar Benarous, Coventry (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 401 days.

(21) Appl. No.: 17/978,546

(22) Filed: Nov. 1, 2022

(65) Prior Publication Data
US 2023/0133572 A1    May 4, 2023

(30) Foreign Application Priority Data

Nov. 4, 2021 (EP) .................................... 21206425

(51) Int. Cl.
*H02P 27/06* (2006.01)
*H02J 9/06* (2006.01)
*B60L 15/20* (2006.01)

(52) U.S. Cl.
CPC .............. *H02J 9/062* (2013.01); *H02P 27/06* (2013.01); *B60L 15/20* (2013.01); *B60L 2200/10* (2013.01); *B64D 2221/00* (2013.01)

(58) Field of Classification Search
CPC ........... H02J 9/062; H02P 27/06; F02K 1/763
See application file for complete search history.

(56) References Cited

U.S. PATENT DOCUMENTS

| | | | |
|---|---|---|---|
| 6,439,504 B1 * | 8/2002 | Ahrendt ................... | F02K 1/763 244/110 B |
| 8,026,681 B2 * | 9/2011 | Alexander ............... | H02P 3/22 318/362 |
| 8,155,876 B2 | 4/2012 | White et al. | |
| 11,065,979 B1 * | 7/2021 | Demont .................... | H02P 5/00 |
| 11,203,999 B2 * | 12/2021 | Le Coq .................... | B64D 33/04 |
| 2015/0266588 A1 | 9/2015 | Bulin et al. | |
| 2016/0068068 A1 * | 3/2016 | Stemmler ................ | B60L 50/61 903/906 |

FOREIGN PATENT DOCUMENTS

JP    2011166954 A  *  8/2011

OTHER PUBLICATIONS

European Search Report for Application No. 21206425.7, mailed Apr. 4, 2022, 6 pages.

* cited by examiner

*Primary Examiner* — Thai T Dinh
(74) *Attorney, Agent, or Firm* — CANTOR COLBURN LLP

(57) ABSTRACT

A system architecture for a backup thrust reverser actuation system control is provided. The system architecture includes an AC power supply of an aircraft, a power supply and a motor control adapted to control an electric motor (M) of a thrust reverser actuation system. The system architecture further includes a backup power supply adapted to provide power to the electric motor in the event that the power supply fails.

7 Claims, 2 Drawing Sheets

BACK-UP THRUST REVERSER ACTUATION SYSTEM CONTROL

CROSS-REFERENCE TO RELATED APPLICATIONS

This application claims priority to European Patent Application No. 21206425.7 filed Nov. 4, 2021, the entire contents of which is incorporated herein by reference.

FIELD OF THE INVENTION

This disclosure relates to back-up actuation system control. In particular, this disclosure relates to back-up thrust reverser actuation system control.

BACKGROUND

Thrust reverser actuation systems enhance the stopping power of aircraft. When deployed, thrust reverser actuation systems redirect the rearward thrust of the jet engine to a forward direction, thus decelerating the aircraft. Since the jet thrust is directed forward, the aircraft will slow down upon landing. Thrust reverser actuation systems must not fail or suffer any permanent damage through use, as this can have catastrophic consequences on landing. Loads on thrust reverser actuation systems after deployment can cause the thrust reverser cowl to accelerate and impact the deployed end stops.

SUMMARY

There is provided a system architecture for a backup thrust reverser actuation system control. The system architecture includes an AC power supply of an aircraft, a power supply and a motor control adapted to control an electric motor of a thrust reverser actuation system. The system architecture further includes a backup power supply adapted to provide power to the electric motor in the event that the power supply fails.

The AC power supply may be connected to a rectifier to convert the AC signal to a DC signal. The rectifier may be connected to a DC link capacitor. Further, the motor control may be connected to an inverter via a motor control line.

The motor control may be connected to a brake control switch via a brake control switch line. The brake control switch may be connected to a brake resistor. Further, the DC link capacitor may be connected in parallel to the brake resistor and the brake control switch. The brake resistor and the brake control switch may be connected in parallel to the inverter to control the electric motor.

The backup power supply may be connected to the rectifier such that, in use, the backup power supply is configured to derive power from a DC supply of the rectifier in the event that the AC power supply and the power supply fail during operation.

The inverter may be a six switch inverter.

The rectifier may be connected to a backup motor control. Further, the backup motor control may be connected to a backup brake control switch and backup brake resistor via a backup brake switch control line.

The backup motor control may be connected to a backup four switch inverter via a backup motor control line. Further, the backup four switch inverter may be connected to the electric motor in order to, in use, control the electric motor in the event that the AC power supply fails during operation.

There is also provided a method for backup thrust reverser actuation system control. The method includes providing an AC power supply of an aircraft, providing a power supply and a motor control adapted to control an electric motor of a thrust reverser actuation system, and providing a backup power supply adapted to provide power to the electric motor in the event that the power supply fails.

DETAILED DESCRIPTION

Figure 1:
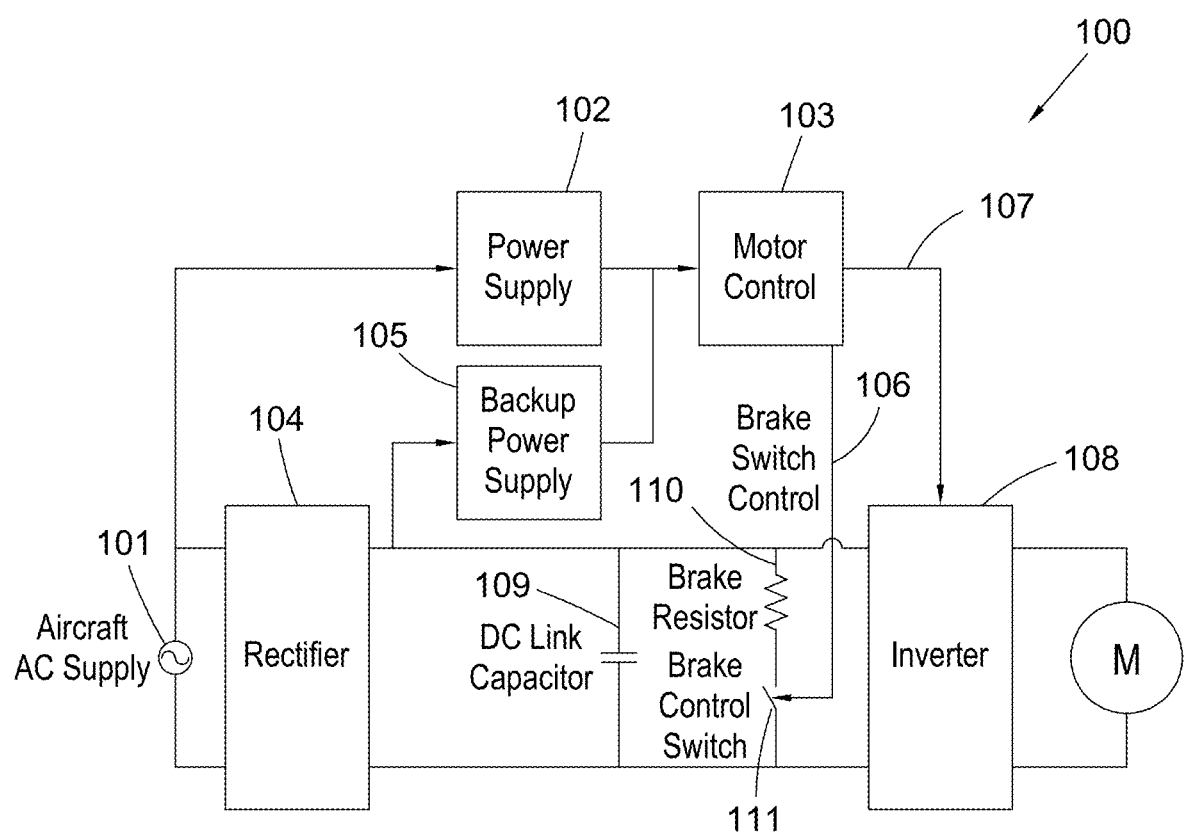
FIG. 1 shows a schematic system architecture for back-up thrust reverser actuation system control.
Figure 2:
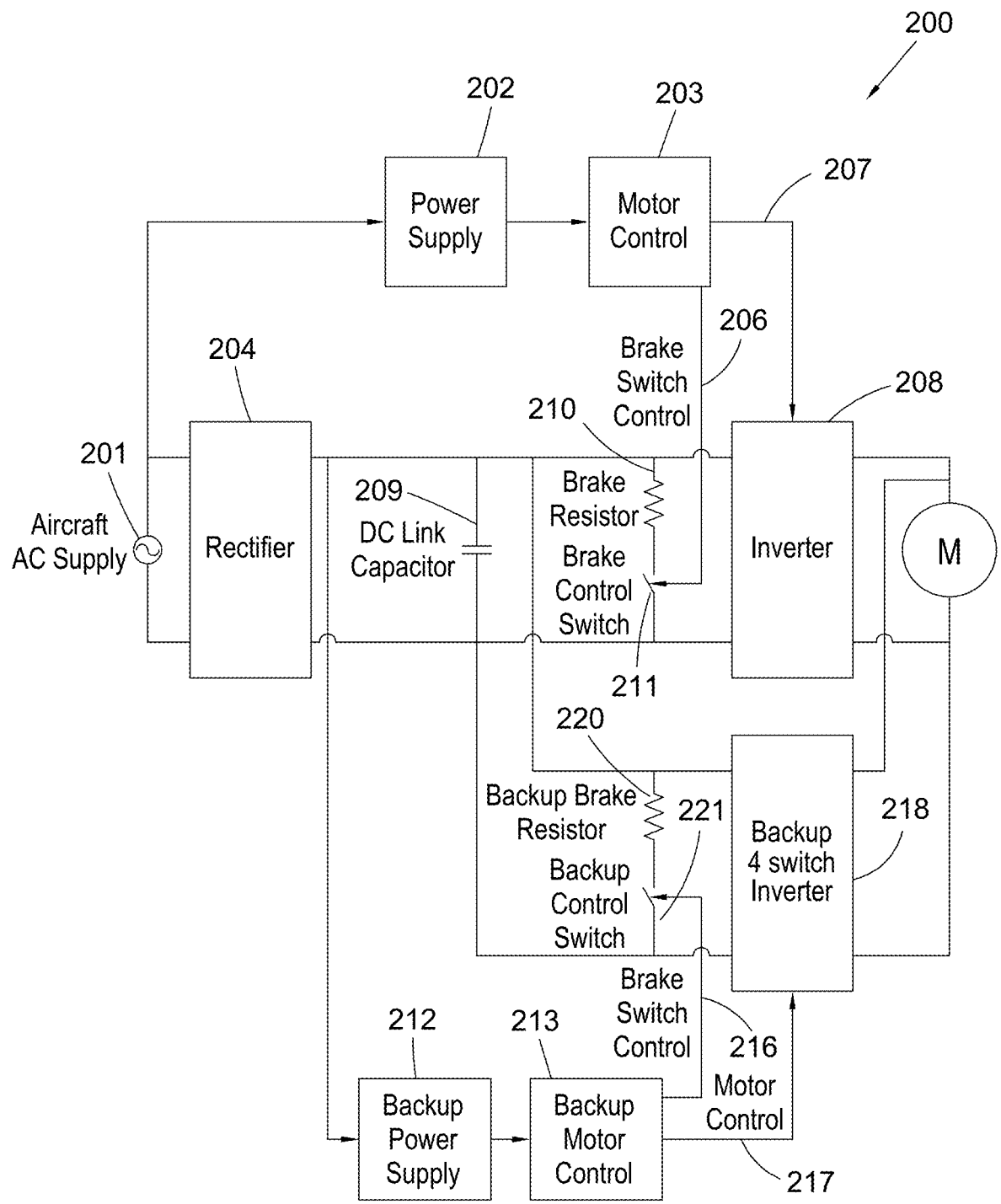
FIG. 2 shows an alternative schematic system architecture for back-up thrust reverser actuation system control.

Electrical system architectures are shown in FIGS. 1 and 2 for backup thrust reverser systems. Any description of 'connected' or 'connection' may be understood to be 'electrically coupled' or 'electrically connected'.

FIG. 1 shows a system architecture 100 for back-up thrust reverse actuation system control to ensure safe system power down. As shown in FIG. 1, the system architecture 100 may include an aircraft AC supply 101 that connects to a power supply 102 and a motor control 103. A motor control line 107 connects the motor control 103 to an inverter 108. The inverter 108 may then power the electric motor M of the system architecture 100.

The AC supply 101 may also be connected to a rectifier 104 to convert the AC signal to a DC signal. The rectifier 104 may be connected to a DC link capacitor 109. As shown in FIG. 1, the motor control 103 may also be connected to a brake control switch 111 via a brake control switch line 106. The brake control switch 111 is connected to a brake resistor 110. The DC link capacitor 109 is connected in parallel to the brake resistor 110 and brake control switch 111, which are further connected in parallel to the inverter 108 to control the electric motor M of the thrust reverser actuation system.

The rectifier 104 may also be connected to a backup power supply 105, which can derive power from a DC supply of the rectifier 104 in the event that the AC supply 101 and power supply 102 fails during operation. The backup power supply 105 therefore acts as a fail-safe mechanism for a thrust reverser actuation system during operation on landing since it is sized to ensure a fail-safe and controlled power down of the system. Providing the backup power supply 105 in the overall system architecture 100 reduces overall weight and cost of a thrust reverser actuation system. For example, the backup power supply 105 enables the system to be switched off in a controlled manner, which, in turn, allows for the size of the end stops to be reduced since impact from uncontrolled end stops can be eliminated.

FIG. 2 shows an alternative example of a system architecture 200 for back-up thrust reverse actuation system control. The example shown in FIG. 2 has the advantage of maintaining reduced system performance following a failure of a power supply or a six switch inverter. As shown in FIG. 2, the system architecture 200 may include an aircraft AC supply 201 that connects to a power supply 202 and a motor control 203. A motor control line 207 connects the motor control 203 to a six switch inverter 208. The six switch inverter 208 may then power the electric motor M of the system architecture 200.

The AC supply 201 may also be connected to a rectifier 204 to convert the AC signal to a DC signal. The rectifier 204 may be connected to a DC link capacitor 209. As shown in FIG. 2, the motor control 203 may also be connected to a brake control switch 211 via a brake control switch line 206. The brake control switch 211 is connected to a brake resistor 210. The DC link capacitor 209 is connected in parallel to the brake resistor 210 and brake control switch 211, which are further connected in parallel to the six switch inverter 208 to control the electric motor M of the thrust reverser actuation system.

As shown in FIG. 2, the rectifier 204 may be connected to a back-up architecture. For example, the rectifier 204 may be connected to a backup power supply 212 and a backup motor control 213. The backup motor control 213 may be connected to a backup brake control switch 221 and backup brake resistor 220 via a backup brake switch control line 216. The backup motor control 213 may be connected to a backup four switch inverter 218 via a backup motor control line 217. The backup four switch inverter 218 is then connected to the electric motor M in order to control the motor M in the event that the AC supply 201 fails. The four switch inverter 218 is sized for smaller loads and power and acts as a fail-safe substitute of the six switch inverter 208 should power fail from the AC supply 201. The system architecture 200 shown in FIG. 2 allows for a complete backup system of each of the 'main' power system components, for example, the power supply 202, motor control 203, brake resistor 210 and brake control switch 211. Including the backup components in the system architecture 200 reduces cost and weight of otherwise complex thrust reverser actuation systems that are known in the art.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A system architecture for a backup thrust reverser actuation system control, the system architecture comprising:
    an AC power supply of an aircraft;
    a power supply and a motor control adapted to control an electric motor (M) of a thrust reverser actuation system; and
    a backup power supply adapted to provide power to the electric motor in the event that the power supply fails;
    wherein the AC power supply is connected to a rectifier to convert the AC signal to a DC signal, and wherein the rectifier is connected to a DC link capacitor, and wherein the motor control is connected to an inverter via a motor control line;
    wherein the inverter is a six switch inverter;
    wherein the rectifier is connected to a backup motor control, and wherein the backup motor control is connected to a backup brake control switch and backup brake resistor via a backup brake switch control line; and
    wherein the backup motor control is connected to a backup four switch inverter via a backup motor control line, and wherein the backup four switch inverter is connected to the electric motor (M) in order to, in use, control the electric motor (M) in the event that the AC power supply fails during operation.

2. The system architecture of claim 1, wherein the motor control is connected to a brake control switch via a brake control switch line, and wherein the brake control switch is connected to a brake resistor, and wherein the DC link capacitor is connected in parallel to the brake resistor and the brake control switch.

3. The system architecture of claim 2, wherein the brake resistor and the brake control switch are also connected in parallel to the inverter to control the electric motor (M).

4. The system architecture of claim 1, wherein the backup power supply is connected to the rectifier such that, in use, the backup power supply is configured to derive power from a DC supply of the rectifier in the event that the AC power supply and the power supply fail during operation.

5. A method for backup thrust reverser actuation system control, the method comprising:
    providing an AC power supply of an aircraft;
    providing a power supply and a motor control adapted to control an electric motor (M) of a thrust reverser actuation system; and
    providing a backup power supply adapted to provide power to the electric motor in the event that the power supply fails;
    wherein the AC power supply is connected to a rectifier to convert the AC signal to a DC signal, and wherein the rectifier is connected to a DC link capacitor, and wherein the motor control is connected to an inverter via a motor control line;
    wherein the inverter is a six switch inverter;
    wherein the rectifier is connected to a backup motor control, and
    wherein the backup motor control is connected to a backup brake control switch and backup brake resistor via a backup brake switch control line;
    wherein the backup motor control is connected to a backup four switch inverter via a backup motor control line, and
    wherein the backup four switch inverter is connected to the electric motor (M) in order to, in use, control the electric motor (M) in the event that the AC power supply fails during operation.

6. The method of claim 5, wherein the motor control is connected to a brake control switch via a brake control switch line,
    wherein the brake control switch is connected to a brake resistor, and
    wherein the DC link capacitor is connected in parallel to the brake resistor and the brake control switch, and wherein the brake resistor and the brake control switch are also connected in parallel to the inverter to control the electric motor (M).

7. The method of claim 5, wherein the backup power supply is connected to the rectifier such that, in use, the backup power supply is configured to derive power from a DC supply of the rectifier in the event that the AC power supply and the power supply fail during operation.

* * * * *